United States Patent [19]
Eckel

[11] 3,712,413
[45] Jan. 23, 1973

[54] SOUND ABSORBING DEVICE
[76] Inventor: Oliver C. Eckel, 155 Fawcett St., Cambridge, Mass. 02138
[22] Filed: Dec. 15, 1971
[21] Appl. No.: 208,116

[52] U.S. Cl. ................... 181/33 GE, 181/33 GA
[51] Int. Cl. ................................................ E04b 1/86
[58] Field of Search .181/33 R, 33 G, 33 GA, 33 GE; 52/144, 145

[56] References Cited
UNITED STATES PATENTS

| | | | |
|---|---|---|---|
| 3,074,505 | 1/1963 | Schulz | 181/33 GA |
| 3,398,811 | 8/1968 | Muller | 181/33 G |
| 3,421,273 | 1/1969 | Eckel | 181/33 GE |

Primary Examiner—Robert S. Ward, Jr.
Attorney—Harold E. Cole

[57] ABSTRACT

A sound absorbing device has a holder with oppositely disposed tongues, which holder receives sound absorbing members that have kerfs in opposite sides thereof into which said tongues enter. Said members have an inner straight portion or base at opposite sides, the outer parts of which are outwardly of said kerfs and extend laterally farther outward than the remainders of said members so that they contact each other to thereby close off the movement of sound waves through my device.

7 Claims, 7 Drawing Figures

PATENTED JAN 23 1973
3,712,413
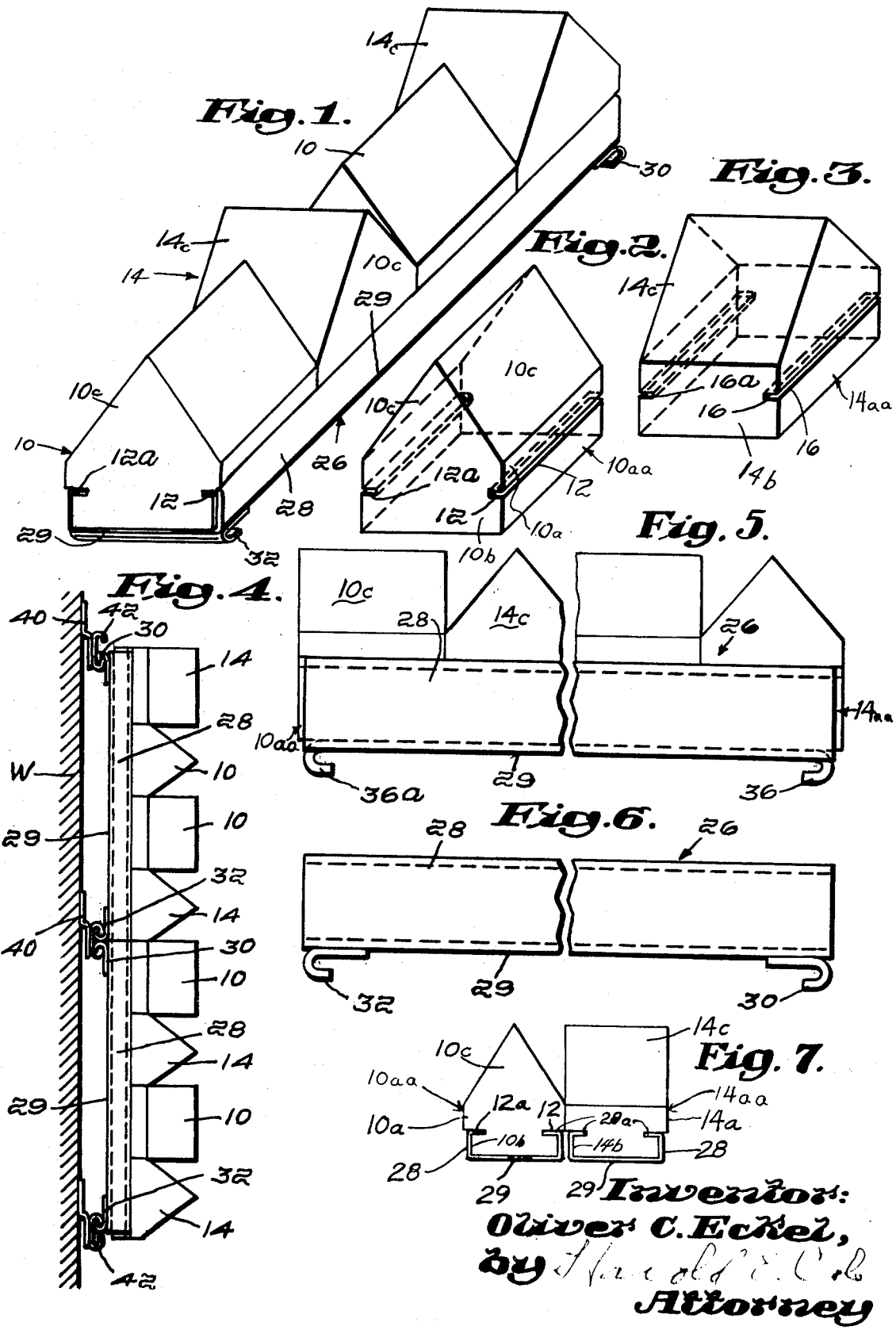

SOUND ABSORBING DEVICE

The principal object of my invention is to provide a support system for sound absorbing members to bar the passage of sound waves through crevices by providing sound absorbing members with parts that extend laterally farther outwardly than adjoining portions of said members, other parts being compressed when said members are assembled and in effect to thus block the passage of sound waves through the crevices.

The foregoing and other objects which will appear as the nature of the invention is better understood, may be accomplished by an assembly and arrangement of parts such as is disclosed by the drawing. The nature of the invention is such as to render it susceptible to various changes and modifications, and therefore, I am not to be limited to the construction disclosed by the drawing, nor to the particular arrangement described in the specification; but am entitled to all such changes therefrom as fall within the scope of my invention.

In the drawing:

FIG. 1 is a perspective view of my device, showing a number of sound absorbing members in assembled position in a holder.

FIG. 2 is a perspective view of a single sound absorbing member showing kerfs in opposite sides thereof.

FIG. 3 is a perspective view similar to FIG. 2; but showing a sound absorbing member in a position at a right angle to that shown in FIG. 2.

FIG. 4 is a side elevation view showing an assembly of sound absorbing members mounted on a holder, the latter being shown attached to a wall.

FIG. 5 is an enlarged, side elevational view showing an assembly of sound absorbing members in a holder prior to installation on a wall or ceiling, and showing connecting hooks that are integral with the bottom of said holder.

FIG. 6 is a side elevational view similar to FIG. 5; but omitting the sound absorbing members, showing connecting hooks welded to the bottom of the holder.

FIG. 7 is an end elevation view, on a reduced scale, showing two sound absorbing members side by side, in final, assembled, compressed condition, showing the holder spaced laterally inward from an outer base part of said member.

As illustrated, my sound absorbing device has a sound absorbing member 10 which may be made of urethane foam or other compressible sound absorbing material, and is wedge-shaped and there is a similar member 14 positioned at a right angle thereto. This arrangement is repeated as desired as shown in FIG. 4. Both members 10 and 14 have slots or kerfs in opposite sides, such as 12 and 12a in member 10, and 16, and 16a in member 14. Said kerfs in each side extend in continuous alignment to receive tongues 28a later referred to.

Each said member 10, at opposite sides, has a straight inner portion or base 10aa having an outer part 10a that bulges laterally outward, as compared with an inner part 10b that is laterally inward, thereof, and may be compressed somewhat, as later referred to. Said member 14 is similar to member 10, having a corresponding base 14aa having an outer part 14a and an inner part 14b at opposite sides. Also, said members 10 and 14 each has an outer wedge-shaped portion 10c and 14c respectively extending from said outer parts 10a and 14a.

Said members 10 and 14, whether there are two or more, are held assembled by a holder or frame 26 which may be made of metal, or other material, firmer than that of said members 10 and 14. It has sides 28 and a bottom 29 integral therewith which terminates at opposite ends in attaching hooks or loops 30 and 32 that are welded thereto, as shown in FIG. 1, or they may be integral with said bottom 29 as shown at 36 and 36a in said FIG. 5. Said sides 28 are provided with tongues 28a that extend laterally and inward in order to respectively enter said kerfs 12 and 16 at one side, and said kerks 12a and 16a at the other side of said members 10 and 14. Said holder 26 is preferably narrower than the normal width of said bases 10aa or 14aa of said sound absorbing members.

My device is attached to the interior of a building such as a wall W, shown in FIG. 4, to which wall there are Z-shaped receivers attached, and double-looped retainers 42 are welded to the latter, and they in turn receive attaching hooks 30 to thus releasably connect my devices to said wall or other support.

In erecting sound absorbing structures every possible space or joint should be sealed or plugged hence said upper parts 10a and 14a of said sound absorbing members extend or bulge laterally outward. Thus when the members are assembled side-by-side, these upper parts 10a and 14a tightly abut each other, eliminating the possibility of there being a leak that would permit the passage of sound waves. The metal sides 28 even if they abut each other, are not in sealed engagement hence there would be some leakage at these joints. Said inner parts 10b and 14b go between said holder sies 28, and the material can be compressed to accomplish this.

What I claim:

1. A sound absorbing device comprising a holder having oppositely disposed sides, a plurality of sound absorbing members each having an inner straight base have an inner part and an outer part, said holder sides having an outer terminating point between said inner and outer parts, said outer parts extending laterally farther outward than said inner parts whereby said outer parts firmly contact each other.

2. A sound absorbing device as of claim 1, the material forming said base inner parts being in compressed condition and being within said holder sides.

3. A sound absorbing device as of claim 1, said base outer parts extending laterally farther outward than said holder sides.

4. A sound absorbing device as of claim 1, said base outer parts extending laterally farther outward than said holder sides.

5. A sound absorbing device as of claim 1, said outer parts extending lengthwise beyond opposite ends of said holder.

6. A sound absorbing device as of claim 2, said base outer parts extending laterally farther outward than said holder sides, the width of said holder between its said oppositely disposed sides being less than the normal width of said inner straight base, said holder being formed of non-compressible material.

7. A sound absorbing device as of claim 1, said sound absorbing members having kerfs at opposite sides extending laterally inward towards each other and being inwardly of said outer parts, said holder having tongues extending laterally inward from each said side towards each other and respectively entering said kerfs.

* * * * *